United States Patent [19]
Tanaka et al.

[11] Patent Number: 5,324,107
[45] Date of Patent: Jun. 28, 1994

[54] CONTROL METHOD, MONITORING METHOD, AND CONTROL DEVICE FOR KNEADER

[75] Inventors: Tatsuya Tanaka; Hiromi Kihara; Norifumi Yamada; Takeshi Hatanaka, all of Takasago, Japan

[73] Assignee: Kabushiki Kaisha Kobe Seiko Sho, Kobe, Japan

[21] Appl. No.: 103,752

[22] Filed: Aug. 10, 1993

[30] Foreign Application Priority Data

Aug. 10, 1992 [JP] Japan .................................. 4-213066
Jul. 12, 1993 [JP] Japan .................................. 5-171866

[51] Int. Cl.$^5$ .......................... B29B 5/00; B01F 15/02
[52] U.S. Cl. ...................................... 366/76; 366/151; 366/601
[58] Field of Search ................. 366/76, 77, 78, 79, 366/132, 150, 151, 154, 601; 425/145, 135

[56] References Cited

U.S. PATENT DOCUMENTS

| | | | |
|---|---|---|---|
| 4,197,070 | 4/1980 | Koschmann | 366/079 |
| 4,759,705 | 7/1988 | Otake | 425/145 |
| 4,818,113 | 4/1989 | Patel | 366/076 |
| 5,200,220 | 4/1993 | Capodieci | 366/601 |

Primary Examiner—Robert W. Jenkins
Attorney, Agent, or Firm—Oblon, Spivak, McClelland, Maier & Neustadt

[57] ABSTRACT

An object of the present invention is to provide a control method for a kneader suitable for controlling the kneader so as to uniformly disperse a compounding agent in a high-molecular material, enabling energy saving. In controlling the kneader for charging the high-molecular material and the compounding agent into a kneading chamber and kneading the mixture of the high-molecular material and the compounding agent so as to uniformly disperse the compounding agent in the high-molecular material, the control method includes the steps of measuring a sound wave generating from the kneading chamber during kneading, detecting whether or not a waveform of the sound wave has become a waveform generating when the compounding agent is uniformly dispersed, and deciding that the kneading is ended if the waveform of the sound wave has become the waveform generating when the compounding agent is uniformly dispersed. It is preferable to perform envelope detection of the sound wave in controlling the kneader. Further, detection of a second torque peak of the kneader from the sound wave is effective for the control.

12 Claims, 10 Drawing Sheets

FIG. 1

F I G. 2A  KNEADING

F I G. 2B  SIMPLE MIXING TO VISCOSITY REDUCTION AND UNIFORM DISPERSION

CONTROL METHOD, MONITORING METHOD, AND CONTROL DEVICE FOR KNEADER

BACKGROUND OF THE INVENTION 1. (Field of the Invention)

The present invention relates to a control method, a monitoring method, and a control device for a batch type or a continuous type kneader for kneading a high-molecular material (polymer).

2. (Description of the Prior Art)

In the field of kneading of polymer, a batch type closed kneader called a Banbury mixer or a continuous type mixer having a material feeding unit and a kneading unit is widely used to compound various additives into the polymer and knead a compound thus obtained. As an recent example of the continuous type mixer, a biaxial extrusion kneader additionally having an extruding unit at the end of the kneading unit is also widely used. As the condition for satisfying the physical property of a kneaded object, a uniform degree of plasticity of the kneaded object and a uniform degree of dispersion of compounding additives such as fillers and chemicals are required. To meet this requirements, it is necessary to control a charge time of the additives (charge position in the continuous type), a kneading end timing (material residence time), and other various operating conditions.

Conventionally, the control of a kneading step in the batch type or the control of the kneading unit in the continuous type is conducted by adjustment in setting of the kneader on the basis of empirically determined time, temperature, and power consumption. That is, a sample of a kneaded object is first prepared. Then, a charge quantity (feed quantity), a charge order (charge position), and operating conditions (rotor speed, cooling condition, and material filling quantity) are empirically decided from the result of preparation of the sample. As parameters for deciding a charge time (charge position) and a discharge time (residence time), the reference values of a kneading time, kneaded object temperature, and power consumption are defined, and some of these are employed as a manufacturing standard to conduct the operation of the kneading step. In actual, however, there occur variations in the degree of plasticity and the temperature of polymer, slippage of the charge time, timewise change in tip clearance between a kneading rotor flight and a chamber, and fluctuations in various machine operating conditions, such as fluctuations in machine temperature and rotational speed. Because of these factors, the degree of plasticity of the kneaded object and the degree of dispersion of the compounding additives such as fillers or chemicals are varied even though the kneading temperature and the kneading time (residence time) fall within a tolerance of the reference values. Accordingly, in the case of excessive kneading, there occur a reduction in productivity, defectiveness of physical property, energy loss, variations in quality, etc. In the case of deficient kneading, there occur defectiveness of physical property, etc. In the case where the time of charging the additives slips, there occur defectiveness of physical property, variations in quality, etc. Further, since the conventional operating conditions (rotor speed, cooling condition, and material filling quantity) are fixed from the start to the end of kneading, they disaccord with the physical property varying from bleeding to viscosity reduction, resulting in inefficient kneading.

To solve this problem, there has been conventionally proposed a kneading control method for a closed type kneader employing a control circuit storing as reference elements a power consumption reference pattern for a rotor driving motor and an operating condition reference pattern. The power consumption reference pattern is so set as to correspond to a kneading step in a proper operation of the closed type kneader. The operating condition reference pattern is so set as to predetermine a proper range of a machine temperature condition of the closed type kneader corresponding to a kneading step. In accordance with the operating condition reference pattern, various operating conditions are kept in the proper range. On the other hand, a power consumption of the rotor driving motor during operation is detected, and an actual power consumption based on a detection signal is compared with the power consumption reference pattern. When there is a difference therebetween, the operating condition relating to the power consumption is adjusted within the proper range, whereby adjusting means for various operating conditions are controlled so that the actual power consumption follows the power consumption reference pattern (Japanese Patent Publication No. 60-33530).

This control method conducts the detection of a power consumption and feedback control from viscosity reduction of the kneaded object. Accordingly, this control method is useful in a compound showing univocal correspondence between viscosity reduction and dispersion of carbon, filler, or other materials which dispersion finally decides the physical property, or quality of the kneader object. However, the above control method does not conduct direct control from the dispersion of carbon, filler, or other chemicals in connection with recent trends of various compounds and high quality to be demanded. Accordingly, in a compound not showing the univocal correspondence between the viscosity reduction and the dispersion, the viscosity is satisfied, but the dispersion deciding the final quality is not satisfied. Thus, in many cases, the final quality is not satisfied, and resultantly the above control method is unusable. Further, the dispersion of the final compound is not controlled, but a hysteresis of kneading is followed to result in accumulation of error. Accordingly, the final quality of the kneaded object becomes unsatisfactory in many cases regardless of the fact that electric energy falls within a reference range.

SUMMARY OF THE INVENTION

It is an object of the present invention to provide a control method and a monitoring method for a kneader suitable for controlling the kneader so as to uniformly disperse a compounding agent in a high-molecular material.

It is another object of the present invention to provide a control device for performing the above control method.

It is a further object of the present invention to provide a control method, a monitoring method, and a control device for a kneader which can effect energy saving in a kneading step of the kneader.

According to an aspect of the present invention, there is provided a control method for a kneader for charging a high-molecular material and a granulated compounding agent into a kneading chamber and kneading a mixture of said high-molecular material and said compounding agent so as to uniformly disperse said compounding agent in said high-molecular material, said control method comprising the steps of measuring a sound wave generating from said kneading chamber during kneading; detecting whether or not a waveform of said sound wave has become a waveform generating when said compounding agent is uniformly dispersed; and deciding that the kneading is ended if said waveform of said sound wave has become said waveform generating when said compounding agent is uniformly dispersed.

The detecting step preferably comprises detecting uniform dispersion of said compounding agent when there occurs a decrease in frequency of generation of a waveform having a large amplitude that generates when said compounding agent is crushed by kneading. As another example, the detecting step preferably comprises detecting uniform dispersion of said compounding agent when a waveform having a large amplitude that generates when said compounding agent is crushed by kneading does not generate during a predetermined time interval or more. As still another example, the detecting step preferably comprises performing envelope detection of said sound wave generating from said kneading chamber during kneading, and detecting uniform dispersion of said compounding agent when a magnitude of a waveform obtained after said envelope detection has become a predetermined value or more.

According to another aspect of the present invention, there is provided a control method for a kneader for charging a high-molecular material and a granulated compounding agent into kneading chamber and kneading a mixture of said high-molecular material and said compounding agent so as to uniformly disperse said compounding agent in said high-molecular material, said control method comprising the steps of measuring a sound wave generating from said kneading chamber during kneading; detecting a second torque peak of said kneader from said sound wave measured; and controlling said kneader on the basis of said second torque peak detected.

This invention may be applied to not only a control method for a kneader, but also a monitoring method for a kneader and a control device for a kneader.

Figure 2A:
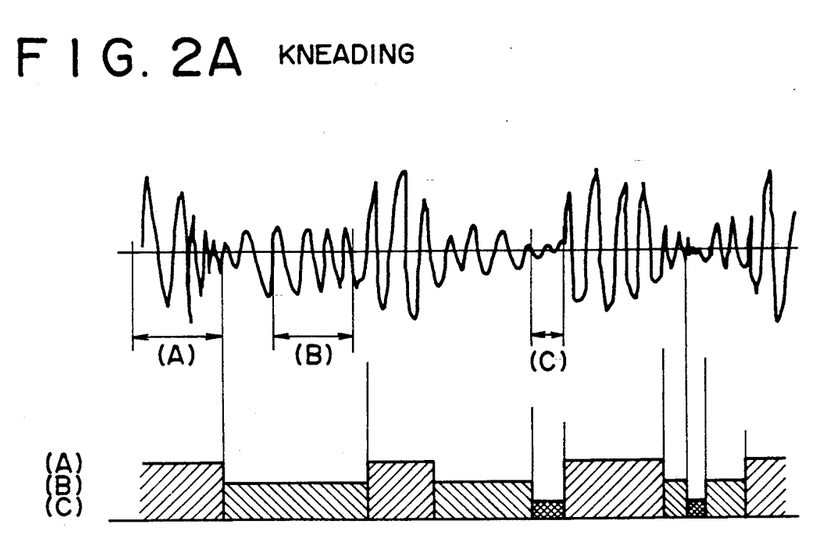
FIG. 2A is a waveform chart of a sound wave generating during kneading.
Figure 2B:
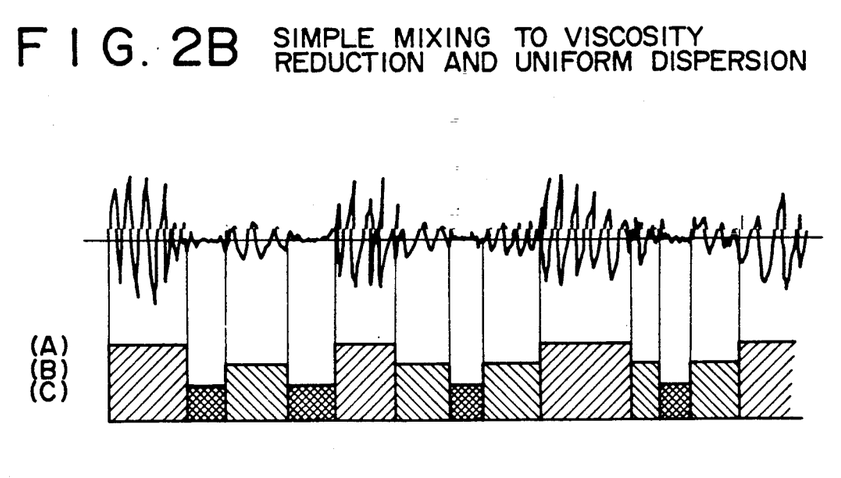
FIG. 2B is a waveform chart of a sound wave generating during the course from simple mixing to viscosity reduction and uniform dispersion.

DESCRIPTION OF THE PREFERRED EMBODIMENTS control method according to the present invention utilizes a sound wave generating during kneading which sound wave is detected by a piezoelectric element mounted on an outside wall of a chamber. It is known that a frequency band of the sound wave generating ranges widely. It has been found that waveform of a sound pressure signal of the sound wave generating from a kneader during kneading in terms of elapsed time shows a tendency corresponding to each of various processes occurring in the kneader, that is, (1) blooming of materials, (2) kneading of powder and high-molecular material, (3) dispersion of an aggregated mass of powder, (4) simple mixing, and (5) viscosity reduction and uniform dispersion. There has been observed a phenomenon that the frequency of occurrence of a waveform having large amplitudes decreases at a stage where the dispersion of a compound is considered to almost end in the course from the process (4) to the process (5) mentioned above. A waveform change is schematically shown in FIGS. 2A and 2B. FIG. 2A shows a waveform change during kneading, and FIG. 2B shows a waveform change during the course from simple mixing to viscosity reduction and uniform dispersion. As shown in FIG. 2A, a sound pressure signal waveform having large amplitudes as shown by (B) frequently appears. A waveform denoted by (A) corresponds to a mechanical sound generating upon collision of a forced material against the chamber. As the process in the kneader is shifted from simple mixing to viscosity reduction and uniform dispersion as shown in FIG. 2B, a sound pressure signal waveform having small amplitudes as shown by (B) and (C) frequently appears. It has been found that the sound pressure signal waveform (C) frequently appears during a time interval while the dispersion is considered to end.

The above phenomenon will be considered as a phenomenon of dispersion of particles. The sound wave generating from the kneader during kneading of polymer and a compounding agent such as carbon, filler, and other materials is detected on the outside wall of the chamber of the kneader. This is due to the fact that detection of the sound wave generating in the kneader is impossible because of a very high vibration damping factor of the polymer as a viscoelastic substance, so the sound wave generating from the outside wall of the chamber is obliged to be detected. The polymer and the compounding agent such as carbon, filler, and other chemicals are subjected to shearing on the inside wall of the chamber by rotation of a rotor in the chamber, and they are accordingly crushed. Thus, the large sound pressure detected is caused by a sound wave generating upon crushing of the polymer and the compounding agent such as carbon, filler, and other chemicals. The frequent occurrence of the small sound pressure proves that the crushing of the particles during kneading has terminated to enter the uniform dispersion process.

With the utilization of the above phenomenon, an optimum kneading method can be realized by occasionally monitoring the waveform of the sound wave generating during kneading.

Figure 1:
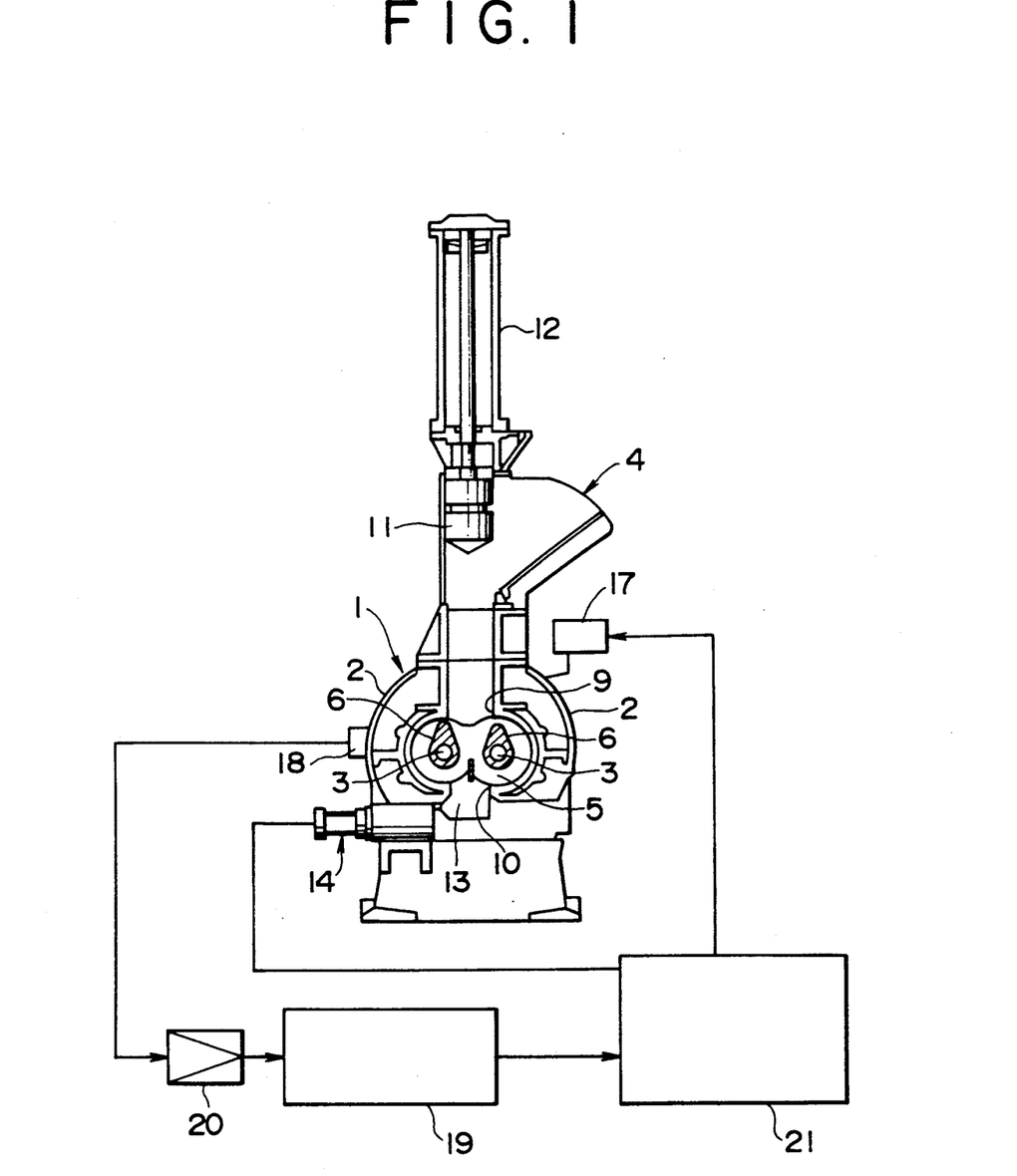
FIG. 1 is a schematic block diagram of a control device for a batch type kneader according to a first preferred embodiment of the present invention.

FIG. 1 shows a first preferred embodiment of the present invention applied to a batch type kneader. Referring to FIG. 1, reference numeral 1 generally designates a kneader body having a pair of right and left chamber side walls 2. A pair of kneading rotors 3 are rotatably supported with lateral shafts to the kneader body 1. A hopper 4 is provided over the kneader body 1. A kneading chamber 5 is defined between the right and left chamber side walls 2 of the kneader body 1. A kneading blade 6 of each kneading rotor 3 is rotated in the kneading chamber 5.

A material charge port 9 for charging a subject material including polymer and a compounding agent such as carbon, filler, and other chemicals is formed at an upper portion of the kneading chamber 5, and a discharge port 10 is formed at a lower portion of the kneading chamber 5. The hopper 4 is provided over the material charge port 9. The hopper 4 includes a material forcing weight 11 for forcing the subject material and a cylinder 12 for vertically moving the weight 11.

The discharge port 10 is operably closed by a drop door 13. The drop door 13 is driven to be opened or closed by a door actuator 14.

Reference numeral 17 denotes a rotor driving motor for rotationally driving the pair of kneading rotors 3. A piezoelectric element 18 is provided on one of the pair of chamber side walls 2 to detect a sound wave generating in the kneading chamber 5 and output a sound pressure signal of the sound wave detected.

Reference numeral 19 denotes a kneading degree deciding section for inputting the sound pressure signal from the piezoelectric element 18 through an amplifier 20, deciding the end of kneading when the frequency of occurrence of the waveform (C) having small amplitudes shown in FIGS. 2A and 2B in the waveform of the sound pressure signal input becomes 20% or more, and outputting a kneading end signal. Reference numeral 21 denotes a kneader control section for driving the door actuator 14 to open the drop door 13 when the kneading end signal is input from the kneading degree deciding section 19. In the case where the kneading operation is to be continued in a batch fashion after the decision of the end of kneading, the subject material is newly charged from the material charge port 9 into the kneading chamber 5 by the cylinder 12, and the rotor driving motor 17 is continued to drive the rotors 3. In the case where the kneading operation is to be stopped after the decision of the end of kneading, the drop door 13 is opened and the rotor driving motor 17 is stopped by the kneading control section 21.

Figure 3:
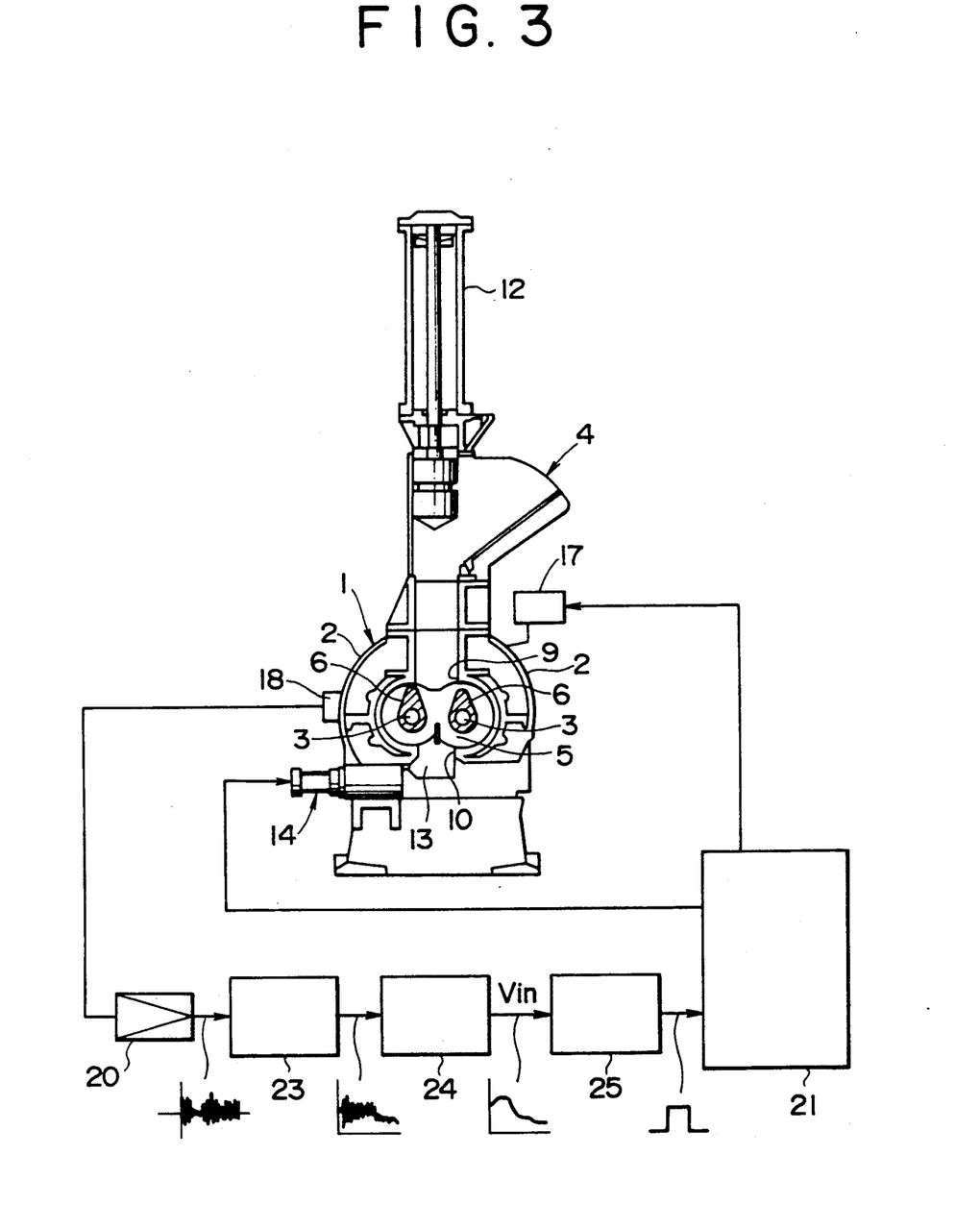
FIG. 3 is a schematic block diagram of a control device for a batch type kneader according to a second preferred embodiment of the present invention.

Referring next to FIG. 3 showing a second preferred embodiment of the present invention, reference numeral 23 denotes an envelope detector for inputting a sound pressure signal from the piezoelectric element 18 through the amplifier 20 and outputting an envelope waveform obtained by connecting the head portions of the waveform of the input second pressure signal with an envelope. Reference numeral 24 denotes a low-frequency pass filter for outputting an envelope detection output waveform Vin eliminating a high frequency from the envelope waveform input from the envelope detector 23. Reference numeral 25 denotes a kneading degree deciding section for deciding a kneading end point shown in FIG. 4 from the envelope detection output waveform input and outputting a kneading end signal to the kneader control section 21. The other construction is similar to that of the first preferred embodiment.

Figure 5:
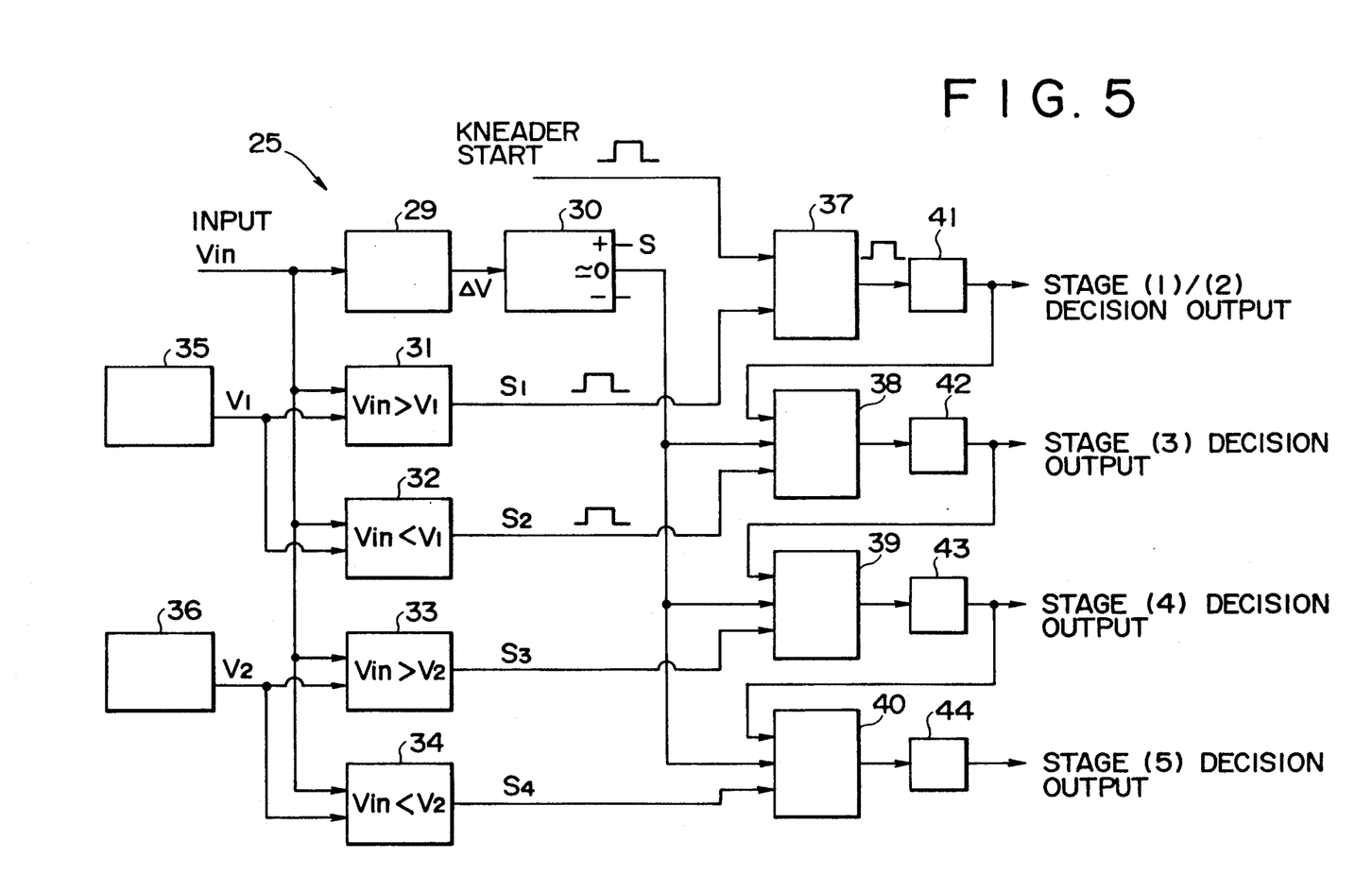
FIG. 5 is a block diagram of a kneading degree deciding section shown in FIG. 3.

As shown in FIG. 5, the kneading degree deciding section 25 includes a voltage change computing circuit 29, a voltage change deciding circuit 30, voltage comparing circuits 31, 32, 33 and 34, reference voltage generating circuits 35 and 36, AND circuits 37, 38, 39 and 40, and stage holding circuits 41, 42, 43 and 44.

The voltage change computing circuit 29 computes a voltage change $\Delta V$ of the envelope detection output waveform Vin input from the low-frequency pass filter 24. The voltage change deciding circuit 30 decides whether or not the voltage change $\Delta V$ computed by the voltage change computing circuit 29 is nearly equal to zero, and outputs a decision signal S, which becomes a high voltage if the voltage change $\Delta V$ is nearly equal to zero, to the AND circuits 38, 39 and 40. The reference voltage generating circuit 35 outputs a reference voltage V1 shown in FIG. 4. The reference voltage generating circuit 36 outputs a reference voltage V2 shown in FIG. 4.

Figure 4:
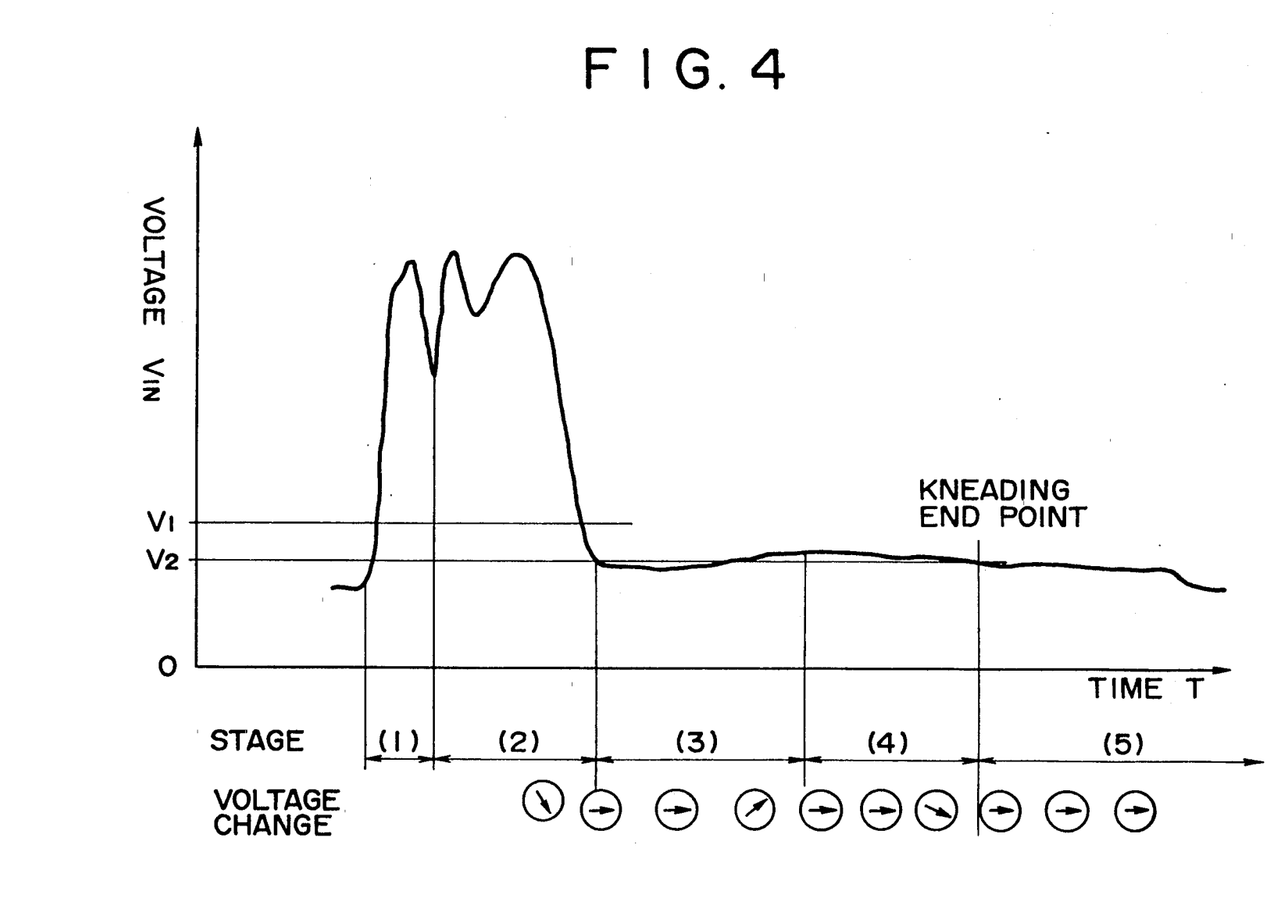
FIG. 4 is a waveform chart obtained by envelope detection of a sound wave generating during kneading.

The voltage comparing circuit 31 compares the envelope detection output waveform Vin with the reference voltage V1, and outputs a decision signal S1, which becomes a high voltage if the envelope detection output waveform Vin is greater than the reference voltage V1, to the AND circuit 37. The voltage comparing circuit 32 compares the envelope detection output waveform Vin with the reference voltage V1, and outputs a decision signal S2, which becomes a high voltage if the reference voltage V1 is greater than the envelope detection output waveform Vin, to the AND circuit 38. The voltage comparing circuit 33 compares the envelope detection output waveform Vin with the reference voltage V2, and outputs a decision signal S3, which becomes a high voltage if the envelope detection output waveform Vin is greater than the reference voltage V2, to the AND circuit 39. The voltage comparing circuit 34 compares the envelope detection output waveform Vin with the reference voltage V2, and outputs a decision signal S4, which becomes a high voltage if the reference voltage V2 is greater than the envelope detection output waveform Vin, to the AND circuit 40.

Each of the state holding circuits 41, 42, 43 and 44 outputs a decision signal which becomes a high voltage if the high voltage from the corresponding AND circuit 37, 38, 39, or 40 is input.

Figure 6:
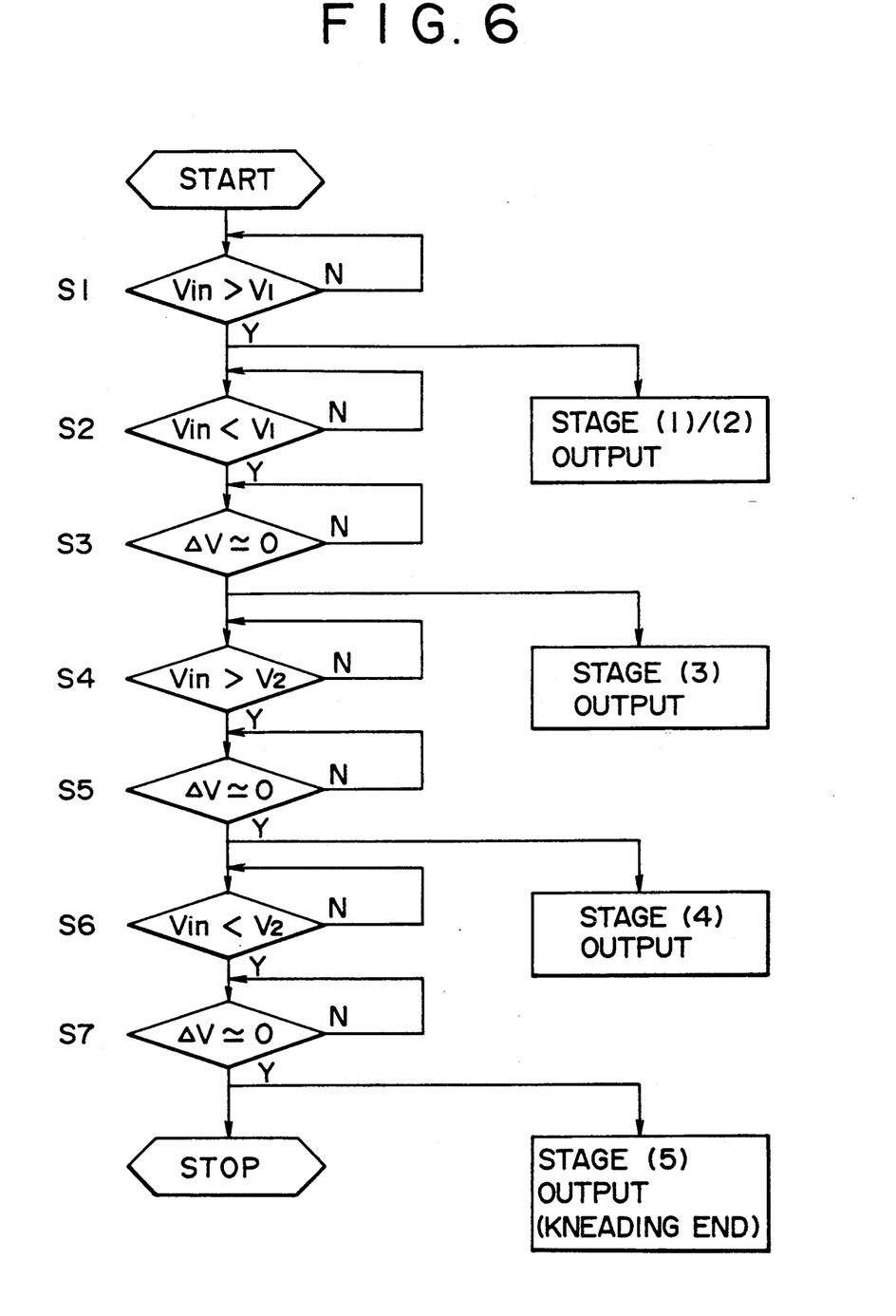
FIG. 6 is a flowchart of the control method according to the second preferred embodiment.

The operation of the kneading degree deciding section 25 will now be described with reference to the flowchart shown in FIG. 6. In step S1, the envelope detection output waveform Vin is compared with the reference voltage V1 by the voltage comparing circuit 31. If the envelope detection output waveform Vin is greater than the reference voltage V1, a stage ① shown in FIGS. 4 and 5 is decided, and the program proceeds to step S2.

In step S2, the envelope detection output waveform Vin is compared with the reference voltage V1 by the voltage comparing circuit 32. If the reference voltage V1 is greater than the envelope detection output waveform Vin, the program proceeds to step S3. In step S3, it is decided whether or not the voltage change $\Delta V$ is nearly equal to zero by the voltage change deciding circuit 30. If the voltage change $\Delta V$ is nearly equal to zero, a stage (3) shown in FIGS. 4 and 5 is decided, and the program proceeds to step S4.

In step S4, the envelope detection output waveform Vin is compared with the reference voltage V2 by the voltage comparing circuit 33. If the envelope detection output waveform Vin is greater than the reference voltage V2, the program proceeds to step S5. In step S5, it is decided whether or not the voltage change $\Delta V$ is nearly equal to zero by the voltage change deciding circuit 30. If the voltage change $\Delta V$ is nearly equal to zero, a stage (4) shown in FIGS. 4 and 5 is decided, and the program proceeds to step S6.

In step S6, the envelope detection output waveform Vin is compared with the reference voltage V2 by the voltage comparing circuit 34. If the reference voltage V2 is greater than the envelope detection output waveform Vin, the program proceeds to step S7. In step S7, it is decided whether or not the voltage change $\Delta V$ is nearly equal to zero by the voltage change deciding circuit 30. If the voltage change $\Delta V$ is nearly equal to zero, a stage (5) shown in FIGS. 4 and 5 is decided, and the kneading end signal is output to the kneader control section 21.

Figure 7:
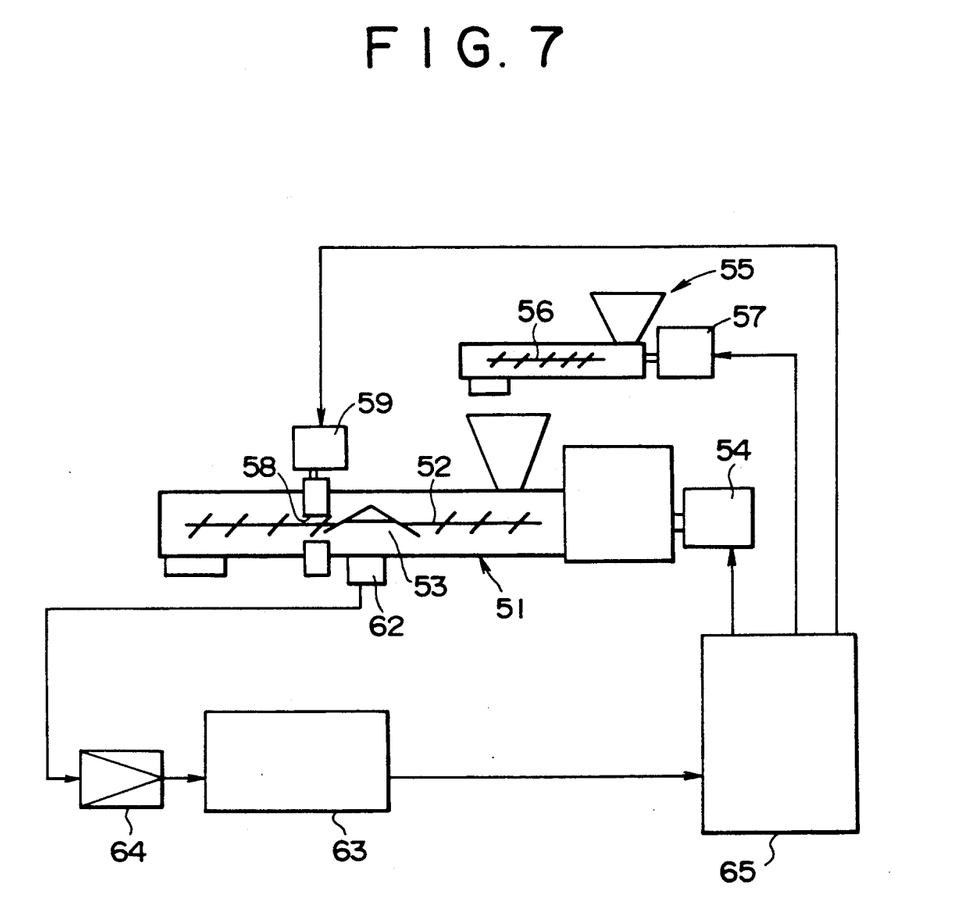
FIG. 7 is a schematic block diagram of a control device for a continuous type kneader according to a third preferred embodiment of the present invention.

Referring next to FIG. 7 showing a third preferred embodiment of the present invention applied to a continuous type kneader, reference numeral 51 generally designates a kneader body. A kneading rotor 52 is provided in the kneader body 51. A kneading chamber 5 is defined in the kneader body 51. A rotor driving motor 54 is provided to drive the kneading rotor 52. Reference numeral 55 generally designates a material supply unit. The material supply unit 55 is provided with a material supplying rotor 56 and a rotor driving motor 57 for driving the material supplying rotor 56. A subject material is supplied from the material supply unit 55 to the kneader body 51 by the rotation of the material supplying rotor 56. The subject material supplied from the material supply unit 55 to the kneader body 51 is fed and kneaded in the kneading chamber 53 by the rotation of the kneading rotor 52. After kneading, the subject material is discharged from a discharge port 58 of the kneading chamber 53. Reference numeral 59 denotes a kneading degree adjusting mechanism for adjusting an opening amount of the discharge port 58.

A piezoelectric element 62 is provided on the kneader body 51 to detect a sound wave generating in the kneading chamber 53 and output a sound pressure signal of the sound wave. The sound pressure signal from the piezoelectric element 62 is input through an amplifier 64 into a kneading degree deciding section 63. The kneading degree deciding section 63 decides whether or not the frequency of occurrence of the waveform (C) having small amplitudes shown in FIGS. 2A and 2B in the waveform of the sound pressure signal input becomes about 20%, thereby deciding moderate kneading, excessive kneading, or deficient kneading. A kneading degree decision signal from the kneading degree deciding section 63 is input into a kneader control section 65. If the excessive kneading is decided, the kneader control section 65 controls to increase a rotational speed of the rotor driving motor 54 for the kneading rotor 52, decrease a rotational speed of the rotor driving motor 57 for the material supplying rotor 56, or drive the kneading degree adjusting mechanism 59 so as to increase the opening amount of the discharge port 58. If the deficient kneading is decided, the kneader control section 65 controls to decrease the rotational speed of the rotor driving motor 54, increase the rotational speed of the rotor driving motor 57, or drive the kneading degree adjusting mechanism 59 so as to decrease the opening amount of the discharge port 58. Thus, the kneader control section 65 automatically controls the kneading degree so that it becomes moderate.

Figure 8:
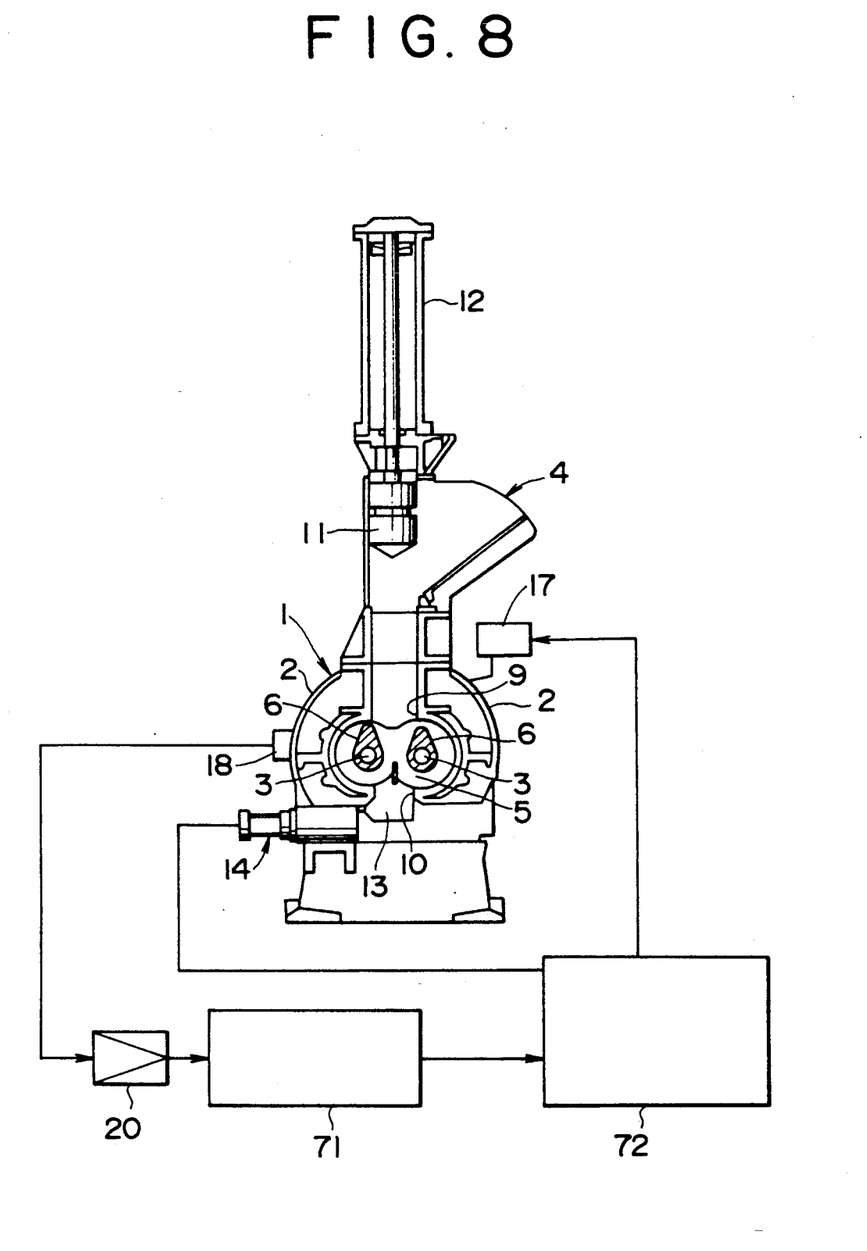
FIG. 8 is a schematic block diagram of a control device for a batch type kneader according to a fourth preferred embodiment of the present invention.
Figure 9:
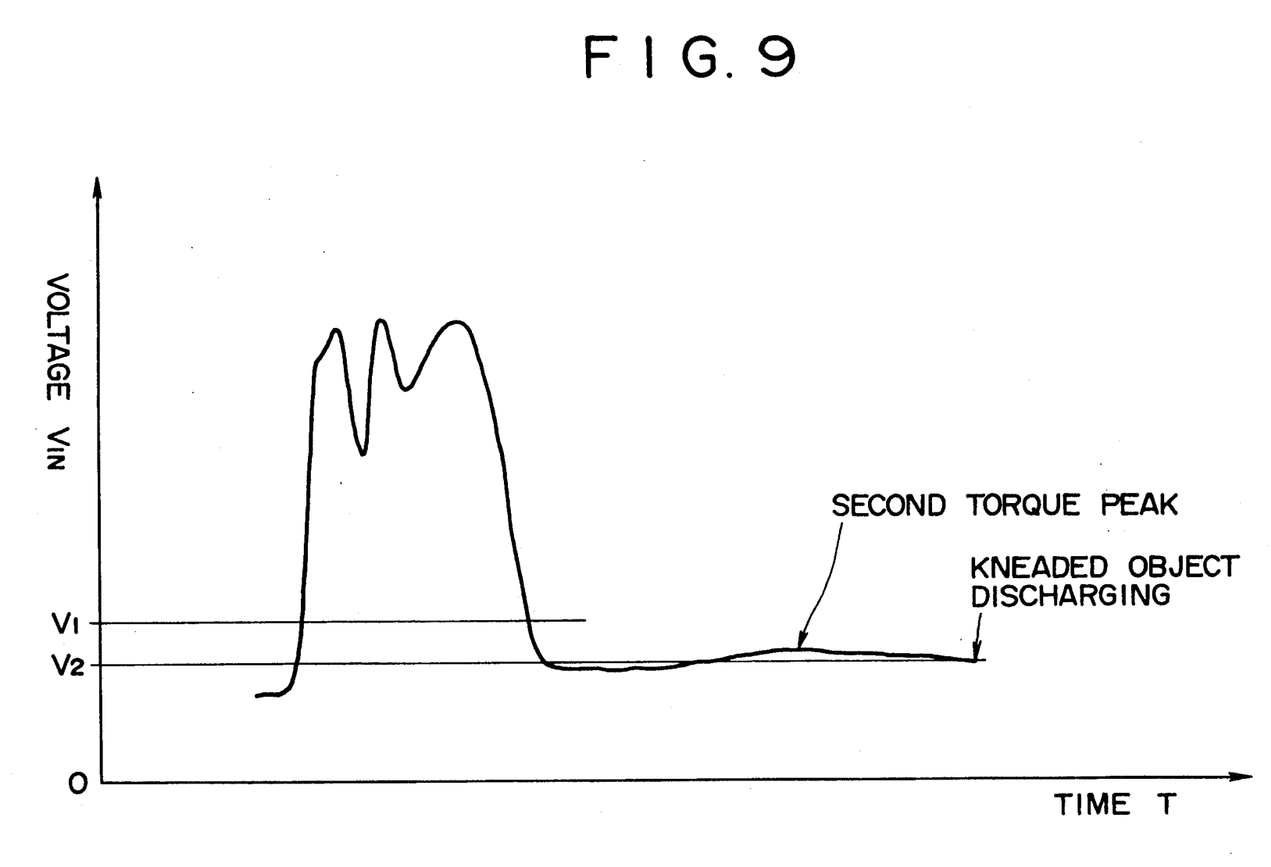
FIGS. 9 and 10 are waveform charts showing a second torque peak in different compounds.
Figure 10:
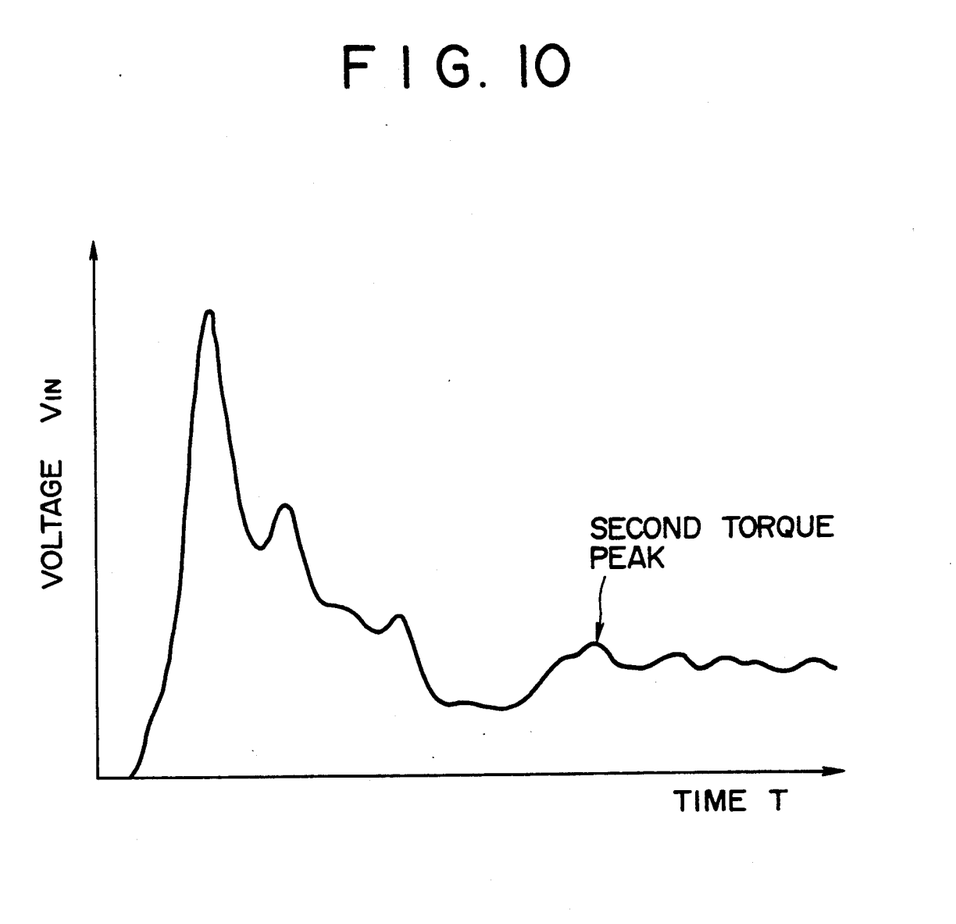

FIGS. 8 to 10 show a fourth preferred embodiment of the present invention, in which described is a kneader control method including the steps of supplying a high-molecule material and a granulated compounding agent into a kneading chamber, and kneading a mixture of the high-molecular material and the compounding agent so as to uniformly disperse the compounding agent in the high-molecular material. The kneader control method is characterized in that it comprises the steps of measuring a sound wave generating from the kneading chamber during kneading, detecting a second torque peak of the kneader from a waveform of the sound wave, and controlling the kneading on the basis of the second torque peak detected.

In the previous preferred embodiments, the kneading is controlled by the method of deciding the end of kneading, which method is effected by detecting small amplitudes of the waveform of the sound wave generating from the kneading chamber when the viscosity of the subject material is lowered. However, it is considered that not only the end of kneading should be decided, but also the circumstances of kneading should be monitored during the course of kneading according to various compounds such as a compound ending the kneading in one cycle of kneading step, a compound rapidly increasing in temperature, a compound requiring a long kneading time of one cycle of kneading step, and a compound requiring the division of the kneading step into several steps according to a procedure of mixing of additives. In these cases, a change in electric power waveform is conventionally monitored to observe two peaks of the waveform when carbon is added to polymer, and a second torque peak appearing when the free carbon particles almost disappear is detected. After detecting the second torque peak, a kneading time and a power consumption are controlled to ensure the dispersion of the carbon to some extent. Then, the kneading operation is continued to obtain a final kneaded object. The method of measuring the second torque peak mentioned above has an effect of ensuring the dispersion of the carbon to some extent by the detection of a value of electric power. However, in many cases, the second torque peak does not clearly appear in dependence upon compounds. Even when a kneading pattern anticipating the time of appearance of the second torque peak is used, the appearance of the second torque peak becomes unstable. Accordingly, although the dispersion of the carbon to some extent can be expected, variations between batches become very large, and much labor is needed in making uniform the qualities on the dispersion of the carbon in the subsequent kneading operation. In particular, such a problem frequently occurs in compounding soft EP (ethylene propylene) polymer, and the uniform quality is greatly owed to the experience of an operator.

To solve the above problem, the method of this preferred embodiment has been achieved. In general, the second torque peak appears at the time when the high-molecular material and the granulated free carbon are uniformly mixed, and the kneaded object is discharged after tens of seconds. Therefore, it is important to surely detect the occurrence of the second torque peak in surely deciding the end of kneading and discharging the kneaded object with the variations reduced, which operation accords with the actual operation by the operator.

As the result of great investigation on this preferred embodiment in respect of the detection of the second torque peak, it has been found that a sound wave peak corresponding to the second torque peak can be detected even in a material hardly causing the second torque peak in dependence upon compounds by analyzing the circumstances of generation of a sound wave.

The fourth preferred embodiment will now be described with reference to FIGS. 8 to 10. Referring to FIG. 8, a sound wave generating in the kneading chamber 5 is received through the chamber side wall 2 by the piezoelectric element 18, and is converted into a voltage, which is in turn amplified by the amplifier 20. Reference numeral 71 denotes a kneading degree deciding section for inputting a sound pressure signal from the piezoelectric element 18 through the amplifier 20, detecting the second torque peak shown in FIGS. 9 or 10 from the second pressure signal input, deciding the end of kneading when a predetermined time has elapsed after detection of the second torque peak, and outputting a kneading end signal. Reference numeral 72 denotes a kneader control section for driving the door actuator 14 to open the drop door 13 when inputting the kneading end signal from the kneading degree deciding section 71.

According to the fourth preferred embodiment mentioned above, the waveform of the second wave generating in the kneading chamber 5 is converted into a voltage waveform by the piezoelectric element 18 mounted on the chamber side wall 2 of the kneading chamber 5, and the voltage waveform is amplified by the amplifier 20, thereby knowing the circumstances of kneading occurring in the kneading chamber 5. The sound wave is detected when the polymer and the carbon are crushed in the kneading chamber 5, and a large elastic wave is generated when the massive free carbon is dispersed and disappears, at which time a peak of the sound wave is detected. This time of detection of the peak is assumed as the same as that of the second torque peak on a value of electric power, thereby easily detecting the second torque peak that is hard to detect in dependence upon compounds. Further, the variations of the kneaded objects between batches can be eliminated by setting a kneading time or a temperature of the polymer to be discharged as measured from the time of detection of the second torque peak.

FIG. 9 shows a waveform in terms of elapsed time obtained by amplifying a sound pressure signal detected in kneading a compound of SBR 1712 as a main polymer and carbon by using the amplifier 20, and filtering an effective value of voltage output from the amplifier 20. In this compound, the appearance of the second torque peak on the value of electric power can also be relatively easily detected.

FIG. 10 shows a waveform in terms of elapsed time obtained by amplifying a sound pressure signal detected in kneading a compound of EP as a main polymer, which hardly causes the second torque peak, and carbon by using the amplifier 20, and filtering an effective value of voltage output from the amplifier 20. In this compound, an initial peak appears like that in the SBR when the material is charged into the kneading chamber 5, and another peak corresponding to the second torque peak appears at the time near 80 seconds.

According to the present invention, the sound wave itself generating from the kneader is caused by the dispersion of a filler or carbon, and it is a physical property corresponding to the quality of a kneaded object. Accordingly, the monitoring of the sound wave generating is equivalent to the measuring of the dispersion of the filler or the carbon, and optimum control of kneading for the dispersion can be carried out. Further, the optimum control of kneading makes it possible to discharge the kneaded object with the leas specific energy. As a result, energy saving in uniform kneading in the final kneading step can be expected. Further, the method of the present invention can realize an automated operation near an unmanned operation.

According to the control device of the present invention, the dispersion of carbon that could be measured conventionally only in an off-line manner can be measured in an on-line real-time manner, and optimum control of kneading can be carried out by using the result of measurement of the dispersion of carbon. In the conventional control device, a discharge time is decided on the basis of various parameters (kneading time, kneaded object temperature, and power consumption). To the contrary, according to the present invention, the kneaded object can be discharged under an optimum kneaded condition. As a result, energy saving, unmanned operation, automated operation, and labor saving can be effected.

Further, according to the present invention, the sound wave generating from the kneading chamber during kneading is measured; the second torque peak of the kneader is detected from the waveform of the sound wave and the kneading is controlled on the basis of the second torque peak detected above. The sound wave itself generating is caused by the dispersion of a filler or carbon, and it is a physical property corresponding to the quality of a kneaded object. Accordingly, the second torque peak can be detected surely and simply by monitoring the sound wave, and optimum control of kneading for the dispersion of the filler or the carbon with no variations between batches can be carried out. Further, in a compound requiring several times of kneading, a dispersed condition of carbon in the kneaded object to be discharged can be kept always constant, and the subsequent kneading operation can be easily set constant.

We claim:

1. A control method for a kneader for charging a high-molecular material and a granulated compounding agent into a kneading chamber and kneading a mixture of said high-molecular material and said compounding agent so as to uniformly disperse said compounding agent in said high-molecular material, said control method comprising the steps of:

measuring a sound wave generating from said kneading chamber during kneading;

detecting whether or not a waveform of said sound wave has become a waveform generating when said compounding agent is uniformly dispersed; and deciding that the kneading is ended if said waveform of said sound wave has become said waveform generating when said compounding agent is uniformly dispersed.

2. The control method as defined in claim 1, wherein said detecting step comprises detecting uniform dispersion of said compounding agent when there occurs a decrease in frequency of generation of a waveform having a large amplitude that generates when said compounding agent is crushed by kneading.

3. The control method as defined in claim 1, wherein said detecting step comprises detecting uniform dispersion of said compounding agent when a waveform having a large amplitude that generates when said compounding agent is crushed by kneading does not generate during a predetermined time interval or more.

4. The control method as defined in claim 1, wherein said detecting step comprises performing envelope detection of said sound wave generating from said kneading chamber during kneading, and detecting uniform dispersion of said compounding agent when a magnitude of a waveform obtained after said envelope detection has become a predetermined value or more.

5. A monitoring method for a kneader for charging a high-molecular material and a granulated compounding agent into a kneading chamber and kneading a mixture of said high-molecular material and said compounding agent so as to uniformly disperse said compounding agent in said high-molecular material, said monitoring method comprising the steps of:

measuring a sound wave generating from said kneading chamber during kneading; and detecting whether or not a waveform of said sound wave has become a waveform generating when said compounding agent is uniformly dispersed.

6. The monitoring method as defined in claim 5, wherein said detecting step comprises detecting uniform dispersion of said compounding agent when there occurs a decrease in frequency of generation of a waveform having a large amplitude that generates when said compounding agent is crushed by kneading.

7. The monitoring method as defined in claim 5, wherein said detecting step comprises detecting uniform dispersion of said compounding agent when a waveform having a large amplitude that generates when said compounding agent is crushed by kneading does not generate during a predetermined time interval or more.

8. The monitoring method as defined in claim 5, wherein said detecting step comprises performing envelope detection of said sound wave generating from said kneading chamber during kneading, and detecting uniform dispersion of said compounding agent when a magnitude of a waveform obtained after said envelope detection has become a predetermined value or more.

9. A control device for a kneader for charging a high-molecular material and a granulated compounding agent into a kneading chamber and kneading a mixture of said high-molecular material and said compounding agent so as to uniformly disperse said compounding agent in said high-molecular material, said control device comprising:

a piezoelectric element for detecting a sound wave generating from said kneading chamber during kneading;

detecting means for detecting whether or not a waveform of said sound wave detected by said piezoelectric element has become a waveform generating when said compounding agent is uniformly dispersed; and deciding means for deciding whether or not the kneading is ended on the basis of an output waveform from said detecting means.

10. The control device as defined in claim 9, wherein said detecting means comprises envelope detecting means for performing envelope detection of said sound wave detected by said piezoelectric element, and detecting means for detecting uniform dispersion of said compounding agent when a magnitude of an output waveform from said envelope detection means has become a predetermined value or more.

11. A control method for a kneader for charging a high-molecular material and a granulated compounding agent into a kneading chamber and kneading a mixture of said high molecular material and said compounding agent so as to uniformly disperse said compounding agent in said high-molecular material, said control method comprising the steps of:

measuring a sound wave generating from said kneading chamber during kneading;

detecting a second torque peak of said kneader from said sound wave measured; and controlling said kneader on the basis of said second torque peak detected.

12. A control device for a kneader for charging a high-molecular material and a granulated compounding agent into a kneading chamber and kneading a mixture of said high-molecular material and said compounding agent so as to uniformly disperse said compounding agent in said high-molecular material, said control device comprising:

a piezoelectric element for detecting a sound wave generating from said kneading chamber during kneading;

detecting means for detecting a second torque peak of said kneader from said sound wave detected by said piezoelectric element; and control means for controlling said kneader on the basis of an output waveform from said detecting means.

* * * * *